HYDRAULICALLY ACTUATED WELL PACKERS

Original Filed March 30, 1961 5 Sheets-Sheet 1

INVENTOR.
WILLIAM D. MYERS
BY
Mellen and Hanscom
ATTORNEYS.

HYDRAULICALLY ACTUATED WELL PACKERS

Original Filed March 30, 1961 5 Sheets-Sheet 2

INVENTOR.
WILLIAM D. MYERS
BY
Mellin and Hanscom
ATTORNEYS.

HYDRAULICALLY ACTUATED WELL PACKERS

Original Filed March 30, 1961

INVENTOR.
WILLIAM D. MYERS
BY
Mellin and Hanscom
ATTORNEYS.

HYDRAULICALLY ACTUATED WELL PACKERS

Original Filed March 30, 1961 5 Sheets-Sheet 4

INVENTOR.
WILLIAM D. MYERS
BY
Mellen and Hanscom
ATTORNEYS.

HYDRAULICALLY ACTUATED WELL PACKERS

Original Filed March 30, 1961 5 Sheets-Sheet 5

INVENTOR.
WILLIAM D. MYERS
BY
Mellin and Hanscom
ATTORNEYS.

United States Patent Office

Re. 26,085
Reissued Sept. 20, 1966

26,085

HYDRAULICALLY ACTUATED WELL PACKERS

William D. Myers, Houston, Tex., assignor to Baker Oil Tools, Inc., Los Angeles, Calif., a corporation of California Original No. 3,112,796, dated Dec. 3, 1963, Ser. No. 99,598, Mar. 30, 1961. Application for reissue Aug. 20, 1965, Ser. No. 482,660
22 Claims. (Cl. 166—120)

Matter enclosed in heavy brackets [ ] appears in the original patent but forms no part of this reissue specification; matter printed in italics indicates the additions made by reissue.

The present invention relates to subsurface well bore equipment, and more particularly to well tools, such as well packers, adapted to be set hydraulically in well bores.

An object of the invention is to provide an improved well tool adapted to be lowered and set hydraulically in a well bore, in which the hydraulic force holding the tool in set condition remains constant regardless of shifting of certain expandible parts of the tool after setting has occurred, as, for example, extrusion of rubber or rubber-like packing material through clearance spaces, due to high pressures or temperatures.

Another object of the invention is to provide a well tool adapted to be lowered and set hydraulically in a well bore, the hydraulic setting force being applied constantly, in which the tool is released by equalizing the hydraulic setting force through movement of a tubular string to which the well tool is secured, movement of the tubular string being prevented from inadvertently causing equalizing of the hydraulic force.

A further object of the invention is to provide an improved well tool adapted to be lowered and set by hydrostatic pressure in a well bore, the tool being released, when desired, by equalizing the hydrostatic pressure tending to hold it in its set condition.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURES 1 and 1a together constitute a side elevational view and longitudinal section through a well tool disposed in a well casing, with the parts in condition for lowering the tool in the well casing, FIG. 1a constituting a lower continuation of FIG. 1;

FIGS. 2 and 2a together constitute a longitudinal section corresponding to FIGS. 1 and 1a, respectively, the tool being tripped for hydraulic setting, FIG. 2a constituting a lower continuation of FIG. 2;

FIG. 7 is an enlarged cross-section taken along the line 7—7 on FIG. 1a;

FIG. 9 is an enlarged cross-section taken along the line 9—9 on FIG. 2a;

Figure 1:
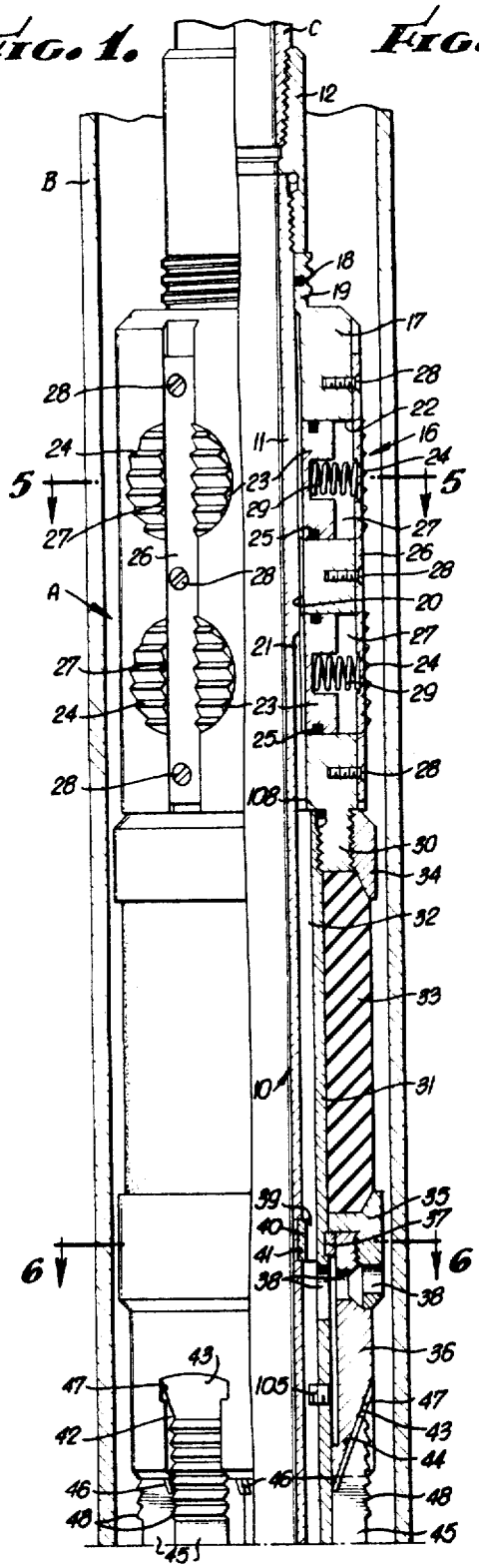

The well tool A illustrated in the drawings is a well packer adapted to be lowered in a well casing B, or similar conduit string, on a tubular running-in string C, such as tubing or drill pipe, to a desired setting point at which the well tool is to be anchored in packed-off condition in the well casing. When desired, the well tool can be released from the well casing and removed entirely therefrom.

As shown, the well tool includes a central tubular body or mandrel 10 made of several sections, including an upper section 11 threadedly secured to a coupling 12, which is, in turn, threadedly attached to the lower end of the tubular string C. The upper section 11 is threadedly attached to an intermediate section 13 of a greater external diameter than the upper section, the intermediate section, in turn, being threadedly secured to a lower section 14 that may have a tubular member 15 secured to its lower end, this tubular member extending downwardly in the well casing by a desired distance.

Surrounding the tubular body 10 is a hydraulic device 16 for preventing upward movement of the well packer in the well casing under the influence of well pressure therebelow. Such device includes an annular body 17 having an upper seal ring 18 adapted to seal against the periphery of the body 10. The seal ring is disposed in an inwardly directed flange 19 at the upper portion of the annular body 17, which serves to space the inner wall 20 of the annular body 17 from the tubular mandrel 10, providing a passage 21 through which fluid under pressure can enter the annular body 17. This annular body 17 has a plurality of generally radial cylinders or bores 22 therein, each of which accommodates a piston-like gripping element 23 having external wickers or teeth 24 adapted to engage and be embodied in the wall of the well casing B when the gripping members are expanded outwardly by fluid pressure. Each piston gripping element has a suitable side seal ring 25 sealing against the wall of the confining cylinder 22 and is maintained in proper oriented condition, so that its external wickers or teeth are disposed in transverse position, by a retainer bar 26 extending longitudinally of the annular body 17 and within external longitudinal slots 27 in the gripping members 23 to prevent the latter from turning. These retainer bars 26 are attached to the body by screws 28, or the like, and also serve as seats for compression retractor springs 29 bearing against the inner surfaces of the bars and also against the gripping members 23, urging latter inwardly to a retracted position. When an adequate fluid pressure differential is present in the annular space 21 between the body 17 and mandrel 10, the pistons 23 are urged outwardly against the force of the springs 29 to embed their teeth 24 in the wall of the well casing. The greater the hydraulic force acting outwardly on the pistons 23, the greater will be the gripping action of their teeth against the well casing.

The lower portion of the annular body 17 serves as an upper abutment 30 which is threadedly attached to the upper end of an upper setting sleeve 31 spaced from the mandrel or body 10 to provide an annular space 32 therebetween through which fluid pressure can pass upwardly for action on the piston gripping members 23. A suitable packing structure 33, such as a pliant, elastic inherently retracted packing sleeve, made of rubber or rubber-like material, encompasses the setting sleeve 31, with its upper end bearing against the upper abutment 30, and also against an upper guage ring 34 threaded on the upper abutment and actually constituting a part thereof. The lower end of the packing sleeve 33 bears against a lower abutment 35 slidable on the setting sleeve 31. This lower abutment may constitute part of a slip expander device being threadedly attached to the main portion of the expander 36. Downward movement of the lower abutment 35 and expander 36 relative to the setting sleeve 31 is limited by engagement of the abutment 35 with a split stop ring 37 mounted in a peripheral groove 37a in the setting sleeve 31. Fluid pressure from the exterior of the apparatus and below the packing sleeve 33, when the latter is expanded out against the well casing B, can pass through ports 38 in the lower abutment 35, expander 36, and setting sleeve 31 to the annular space 32 between the setting sleeve and tubular mandrel 10, such fluid passing upwardly through a suitable longitudinal groove or grooves 39 formed in a split stop ring 40 mounted in a peripheral groove 41 in the mandrel and engageable with the inner wall of the setting sleeve 31.

The expander 36 has circumferentially spaced slots 42 therein, the inner wall 43 of each of which tapers in a downward and inward direction, coacting with a companion inner tapered surface 44 of a slip 45 slidably splined to the expander by inclined tongues 46 on the sides of each slip slidable in companion inclined grooves 47 in the sides of the slot 42 adjacent to its tapered expander surface 43. The slips have wickers or teeth 48 adapted to embed in the wall of well casing B upon outward expansion of the slips, resulting from relative longitudinal movement between the expander 36 and slips 45 in a direction toward each other. Relative separating movement between the expander and slips causes the tongue and groove interconnection 46, 47 to shift the slips 45 from expanded to a retracted position.

The slips 45 are all movable longitudinally together by having their lower portions slidably coupled to a slip ring 50 encompassing the upper setting sleeve 31. The lower end of each slip is formed as a T-shaped head 51 receivable in a companion shaped longitudinal slot 52 in the upper portion of the slip ring 50, thereby coupling the slips for joint longitudinal movement with the slip ring, but permitting lateral movement of the slips 45 into and out of engagement with the wall of the well casing B.

The slip ring 50 is connected to the hydraulic setting portion 53 of the apparatus. As shown, a lower setting sleeve or cylinder 54 is threadedly attached to the slip ring 50 and is slidable along an annular piston 55 secured to the upper setting sleeve 31 by resting upon a split stop ring 56 mounted in a peripheral groove 57 in the upper setting sleeve. The elongate cylindrical portion of the lower setting sleeve or cylinder 54 is spaced from the upper setting sleeve 31, forming a cylinder space or atmospheric chamber 58 therein, the lower end of which is closed by a lower cylinder head 59 slidable along the periphery of the upper setting sleeve 31. Leakage of fluid between the cylinder head 59 and setting sleeve 31 is prevented by one or more side seal rings 60 mounted in the head and slidably sealing against the periphery of the upper setting sleeve. Similarly, leakage of fluid between the annular piston 55 and the wall of the lower setting sleeve 54 is prevented by one or more side seal rings 61 mounted on the peripheral portion of the piston and slidably sealing against the wall of the setting sleeve 54. Leakage of fluid between the interior of the annular piston 55 and upper setting sleeve 31 is prevented by a suitable side seal ring 62 on the piston engaging the periphery of the upper setting sleeve.

The upper setting sleeve 31 extends through the lower cylinder head 59 and is threadedly secured to a lower head 63 slidably mounted on the periphery of the lower section 14 of the tubular mandrel or body 10. Leakage of fluid between the head 63 and the mandrel 10 is prevented by a suitable side seal ring 64 on the head engaging the periphery of the lower mandrel section 14. This head is threadedly attached to a cylinder or sleeve 65 extending upwardly therefrom and having an inwardly directed flange 66 engaging the lower end of the lower setting sleeve cylinder head 59. Upward movement of the lower setting sleeve 54 with respect to the upper setting sleeve 31 is at first prevented by releasably securing the head 59 of the setting sleeve to the cylinder sleeve 65 by means of one or more shear screws 67. The upper setting sleeve 31 cannot move relative to the lower setting sleeve 54 since it is connected thereto through the shear screw 67, cylinder 65 and head 63 threaded on the lower end of the upper setting sleeve 31.

Leakage of fluid between the lower setting sleeve head 59 and the sleeve of the lower cylinder 65 is prevented by a suitable side seal ring 68 on the head engaging the wall of the cylinder 65. The cylinder 65 is spaced laterally from the lower portion of the upper setting sleeve 31, providing an annular cylinder space 69 containing a release piston 70, the upper end of which engages the lower end of the lower setting sleeve head 59. The upper portion of the piston 70 extends within the sleeve flange 66 and its lower portion has an upwardly facing shoulder 71 adapted to engage this flange to limit upward movement of the piston 70 in the lower cylinder 65, as described hereinbelow. Leakage of fluid between the piston 70 and the upper, inner setting sleeve 31 is prevented by a suitable inner side seal ring 72 engaging the periphery of the setting sleeve. Leakage of fluid between the piston 70 and the outer sleeve 65 is prevented by a suitable side seal ring 73 on the piston engaging the inner wall of this latter sleeve.

Figure 9:
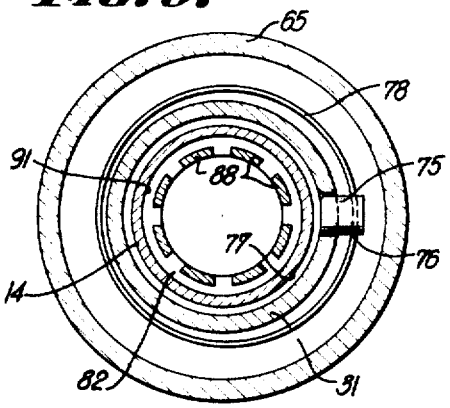

In accomplishing the setting of certain normally retracted parts of the well packer, such as the packing sleeve 33 and lower slips 45, against the wall of the well casing B, the upper and lower setting sleeves 31, 54 are movable longitudinally with respect to each other. As disclosed in the form of invention shown in FIGS. 1 to 9, inclusive, the upper or inner setting sleeve 31 can move, at times, longitudinally relative to the tubular mandrel 10 of the tool, which movement is desirable in some uses of the well packer. When such movement is permitted, however, the setting sleeve 31 is releasably connected to the tubular mandrel 10, so that the parts are movable longitudinally through the well casing B as a unit prior to setting of the tool in the well casing. The releasable connection is provided by a lock key or pin 75 extending through a radial or lateral bore 76 in the lower portion of the inner setting sleeve 31 and received within a peripheral groove 77 in the lower section of the tubular mandrel 10. This key 75 is held initially in the groove 77 by engaging the lower portion of the release piston 70. When the release piston is moved upwardly, as explained hereinbelow, a spring 78 (FIG. 9), which encompasses the lower mandrel section 14, and which is secured to the key 75, is allowed to expand outwardly to remove the key 75 from the groove 77, thereby freeing the inner setting sleeve 31 from the tubular mandrel 10 and permitting relative longitudinal movement between these parts.

The piston 70 is movable upwardly, to release the lock key 75 and also to shear the screw 67 releasably connecting the outer setting sleeve or cylinder 54 to the inner or upper setting sleeve 31, by the application of hydraulic pressure to the release piston 70. This pressure may be obtained by imposing the hydrostatic pressure of the fluid in the tubular string and the mandrel, this pressure, when permitted to do so, passing through one or more side ports 80 in the tubular mandrel 10 and through one or more side ports 81 in the inner setting sleeve 31 into the cylinder 65 for upward action on the piston. Initially, however, the fluid pressure cannot enter the cylinder 65 by virtue of a sleeve valve 82 disposed across the mandrel port 80, this sleeve valve having longitudinally spaced side seals 83 thereon sealingly engaging the mandrel section 14 on opposite sides of its port 80. The sleeve valve 82 is retained in such closed position across the mandrel port by one or more shear screws 84 attached to the mandrel and to the sleeve valve.

The sleeve valve 82 is released hydraullically after dropping a ball 85, or similar tripping valve element, into the tubular string C, which will gravitate through the fluid therein and come to rest upon a valve seat 86 provided by the inwardly projecting spring-like fingers 87 integral with longitudinally extending arms 88 forming the upper portion of the sleeve valve 82. These outwardly directed fingers 87 engage an inner wall 89 of the tubular mandrel 10 to provide the inward restriction or seat 86 upon which the ball valve element 85 comes to rest. When fluid pressure of a sufficient value, as, for example, 1,000 p.s.i., is applied to the fluid in the tubular string C and the tubular body 10, such pressure acts downwardly on the ball valve element 85 and the sleeve valve 82, shearing the screw 84 and causing the sleeve valve 82 to shift downwardly to a position limited by its engagement with a lower mandrel shoulder 90. At this time, the spring fingers 87 are disposed in a larger diameter portion 91 of the mandrel 10, springing outwardly into such portion, and increasing the diameter of the valve seat 86 to a greater value than the diameter of the ball valve element 85, the latter then dropping through the sleeve valve 82 and continuing on down through the mandrel 10 and the tubing 15 therebelow for discharge into the well casing or well bore. With the sleeve valve 82 engaging the shoulder 90, the side ports 80, 81 are open, so that fluid under hydrostatic pressure can then be imposed in the cylinder 65 to urge the release piston 70 upwardly and initiate setting of the tool A in the casing B.

Leakage of fluid between the mandrel 10 and the inner setting sleeve 31 is prevented by a side seal ring 92 on the mandrel engaging the inner wall of the setting sleeve above the inlet port 80. When the mandrel 10 is moved upwardly relative to the inner sleeve 31 to sufficient extent the seal 92 is moved upwardly above vent or equalizing ports 93 in the inner sleeve 31 below the annular piston 55, to allow fluid pressure to enter the atmospheric chamber 58 and thereby equalize the pressure or force acting on the annular piston 55 and also on the lower cylinder head 59. Such hydraulic force is provided by the hydrostatic head of fluid in the well bore, this hydrostatic head of fluid being adapted to enter through the side port 94 in the upper portion of the outer setting sleeve 54 to the interior of the latter above the annular piston 55, urging such annular piston downwardly. When the shear screw 67 is disrupted and the lower head 59 moved upwardly out of the lower sleeve 65, the hydrostatic pressure can act upwardly on the lower cylinder head 59 urging it in an upward direction. Fluid from the annular space 32 is prevented from passing to the ports 93 by a side seal 95 in the body section 13 sealing against the inner sleeve 31.

Figure 1A:
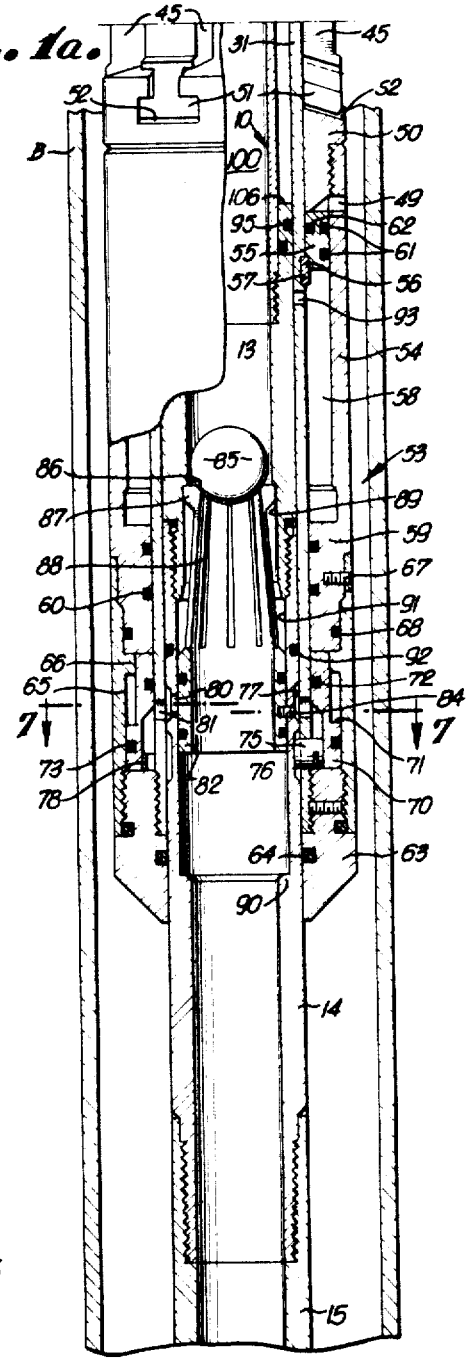

In the operation of the apparatus disclosed in FIGS. 1 to 9, inclusive, the sleeve valve 82 is disposed initially across the ports 80, 81. The upper gripping members 23, packing structure 33 and slips 45 are in retracted position, the shear screws 67, 84 being intact, and the parts occupying the position illustrate in FIGS. 1 and 1a. At this time, the bail valve element 85 has not been dropped into the tubing string C. The apparatus is lowered through the fluid in the well casing B to the desired setting point, whereupon fluid can be circulated down through the tubing string, if desired, to clear the casing of drilling mud, or other weighting material, therewithin. Also, if desired, the connections at the top of the well bore to the tubing string C can be completed. At this time, fluid is prevented from entering the atmospheric chamber 58, which will retain air at atmospheric pressure therewithin, and the hydrostatic head of fluid is prevented from setting the parts since the shear screw 67 is intact and the parts 80, 81 are closed. The hydrostatic head of fluid cannot act upon the outer setting sleeve 54 and move it upwardly relative to the inner setting sleeve 31.

When it is desired to set the well packer, the tripping ball 85 is dropped into the tubular string, gravitating therethough and through the tubular mandrel or body 10 into engagement with the seat 86 provided by the fingers 87 projecting into the mandrel passage 100. Fluid pressure is then imposed on the fluid in the tubing string C, acting downwardly on the ball 85 and sleeve 82 to shear the screw 84, the sleeve moving downwardly to a position opening the ports 80, 81, one in which the spring arms 88 and fingers 87 inherently shift outwardly to permit the ball 85 to pass down through the sleeve valve 82 and out of the apparatus.

Hydrostatic pressure can then enter through the open ports 80, 81 in the mandrel 10 and the inner sleeve 31, moving into the cylinder 65 and acting upwardly on the piston 70 which engages the sleeve head 59. The hydrostatic head of fluid in the well bore is normally sufficient to effect a shearing of the screw 68 and elevation of the piston 70 within the cylinder 65 to a position limited by engagement of the piston with the sleeve flange 66, at which time the sleeve head 59 will have been elevated to move its seal ring 68 out of the cylinder 65, allowing the hydrostatic head of fluid to then act on the underside of the head 59 and urge it and the sleeve 54 in an upward direction (see FIGS. 2 and 2a). At this time, the piston 70 has been removed from behind the lock key 75, allowing the spring 78 to shift the key out of the mandrel groove 77, freeing the inner sleeve 31 from the mandrel 10 and permitting the inner sleeve and mandrel to shift longitudinally with respect to one another.

Prior to removal of the key 75 from the groove 77, downward movement of the tubular string C and mandrel 10 is transmitted to the inner sleeve 31 by the abutting of the coupling of sub 12 with the upper end of the anchor body 17. If such abutting did not occur, then the upper side of the groove 77 would engage the key 75 to move the inner sleeve 31 downwardly with the mandrel 10, and all of the other parts surrounding the mandel 10 would also move downwardly therewith. Similarly, if the tubular string C were to be moved upwardly prior to release and setting of the well tool, the lower side of the groove 77 would engage the key 75 and move all of the parts surrounding the mandrel 10 upwardly with it.

Figure 2:
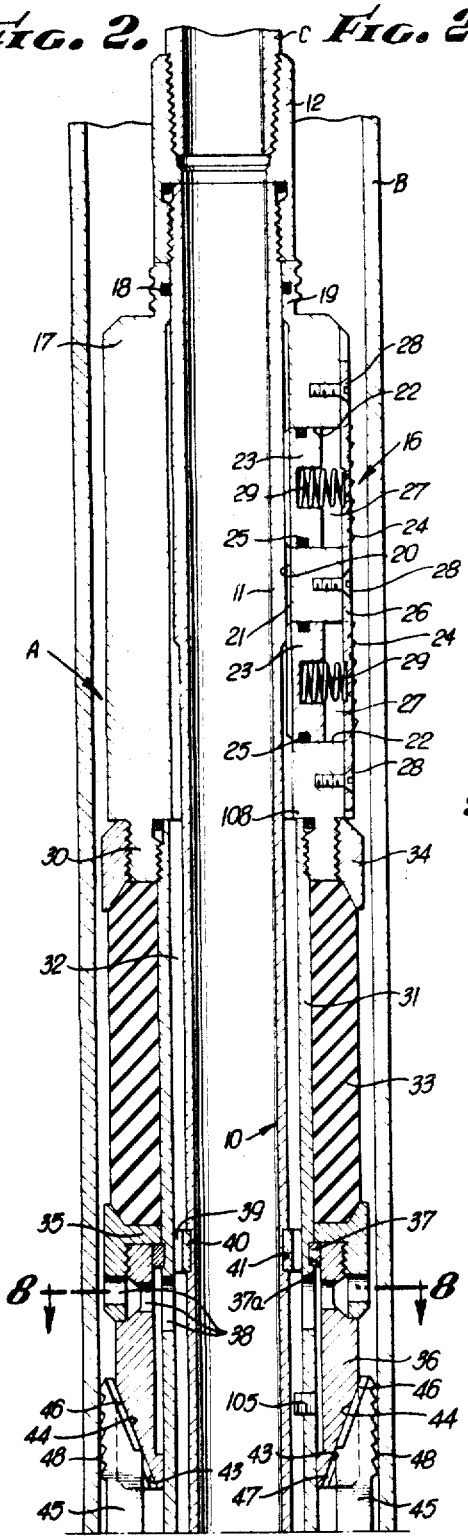
Figure 2A:
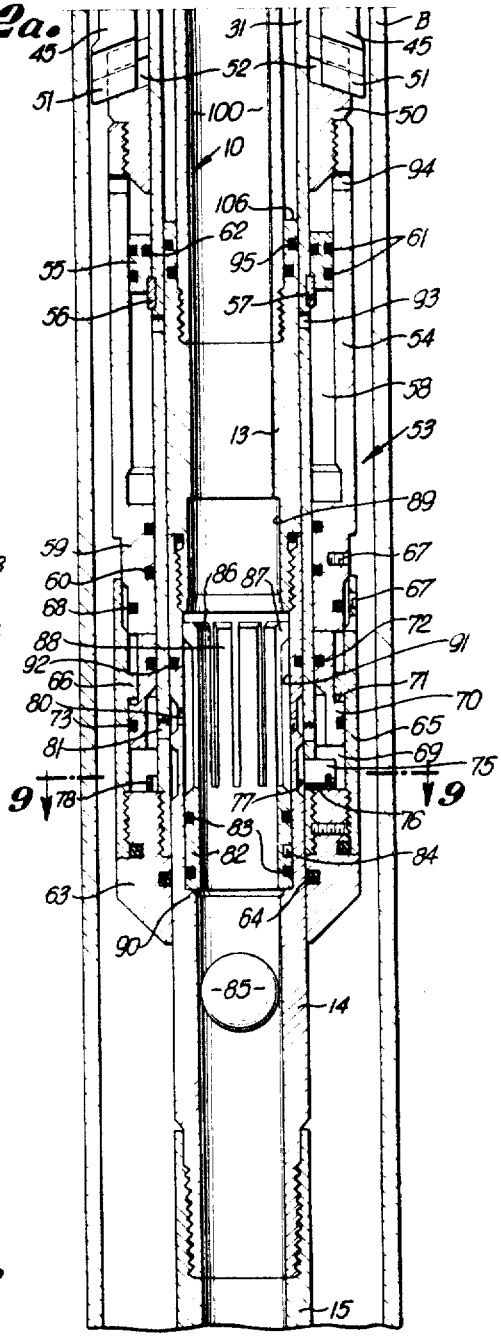
Figure 3:
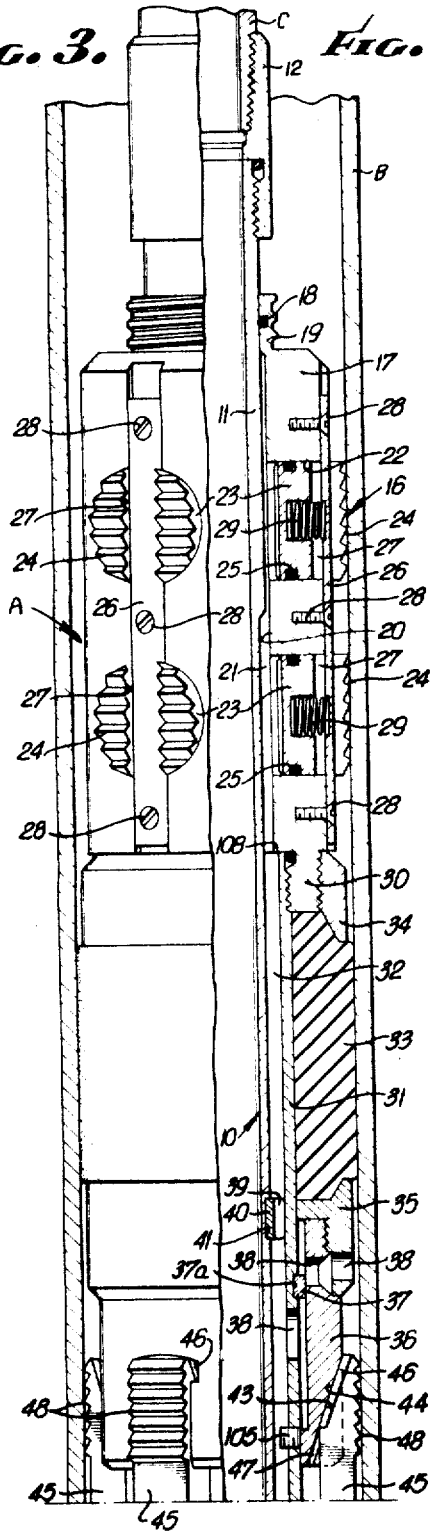
FIGS. 3 and 3a are views corresponding to FIGS. 1 and 1a, respectively, illustrating the tool anchored in packed-off condition in the well casing, FIG. 3a constituting a lower continuation of FIG. 3.
Figure 3A:
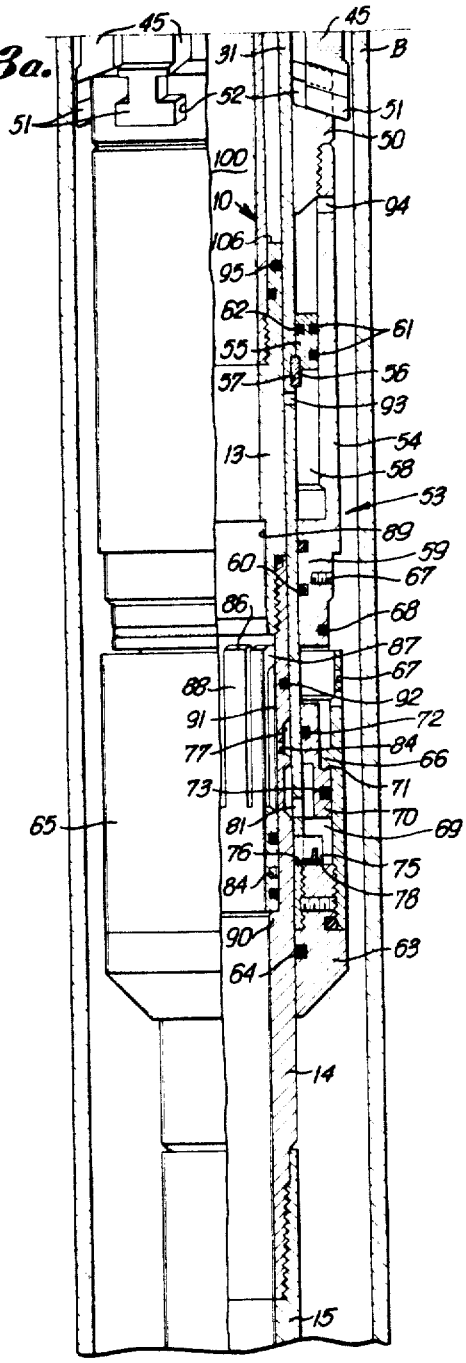

With the parts in the position illustrated in FIGS. 2 and 2a, following upward movement of the piston 70 and its shearing of the screw 67, the sleeve 54 then moves upwardly to shift the slips 45 upwardly along the expander 36 and outwardly toward the wall of the well casing B. The key or pin 75 is now out of the groove 77, so that the hydrostatic head of fluid acting downwardly on the piston 55 can urge the inner sleeve 31 relatively in a downward direction and the outer sleeve 54 relatively in an upward direction, in view of the pressure differential across the upper piston 55 and the lower piston or head 59, since the atmospheric chamber 58 still only retains air at substantially atmospheric pressure therewithin. As a result, the anchor body and upper abutment 17, 30 is moved relatively downwardly with the inner sleeve 31, carrying the packing 33 and expander 36 downwardly with it to wedge the expander within the slips 45, the wickers 48 of the latter embedding themselves in the wall of the well casing B. Continued application of the upward hydrostatic force on the outer sleeve 54, and through the latter on the slip ring 50 and slips 45, and of the donward force on the inner sleeve 31 by the hydrostatic head of fluid acting downwardly on the piston 55 then moves the upper abutment 30 and the entire anchor body 17 downwardly relative to the lower abutment 35 to shorten the packing 33 and effect its expansion outwardly into sealing engagement with the wall of the well casing B, the parts then occupying the relative positions illustrated in FIGS. 3 and 3a.

Any pressure in the annulus between the tubing string C and casing B acting downwardly on the well tool A will then tend to urge the packing 33 and expander 36 downwardly to a further extent, to more firmly wedge the expander 36 into the slips 45, thus precluding downward movement. In the event that pressure in the well casing below the packing 33 tends to elevate the well packer and release it, such tendency is prevented by the upper anchor portion 16 of the apparatus, the fluid pressure passing through the ports 38 into the annular space 32, 21 between the inner setting sleeve 31 and mandrel 10, and between the anchor body 17 and the mandrel 10, the pressure acting on the inner ends of the pistons 23 and urging them outwardly against the force of the springs 29 to embed their wickers 24 in firm gripping engagement with the wall of the well casing. The greater the pressure in the well casing B below the packing 17, tending to elevate the tool A, the greater is the outward force exerted by such pressure on the pistons 23 to embed their wickers 24 in the wall of the well casing, and resist and prevent such upward movement of the well packer.

The well packer A will remain in its anchored and packed-off condition, there being a constant setting force being exerted on the inner and outer sleeves 31, 54 tending to move the inner sleeve 31 downwardly and the outer sleeve 54 upwardly, to maintain the slips 45 and packing 33 set against the wall of the well casing. In the event that any rubber material of the packing 33 were to extrude between the clearance spaces between the abutments 35 and 30, 34 and the wall of the well casing, the hydrostatic head of fluid acting downwardly on the upper piston 55 and upwardly on the lower piston 59 would shift the parts sufficiently so as to continue to exert the same force maintaining the packing 33 and lower slips 45 in set condition. Thus, the well packer A will remain in packed-off condition against movement in both directions.

In the event of any tendency for the tubular string C to move upwardly in the well casing B, as due to its contraction resulting from decrease in temperature of the fluid in the well casing, such upward movement would be transmitted to the tubular mandrel 10 and would shift it upwardly within the sleeve 31 and anchor body 17. To insure that the tubular mandrel will not move upwardly to a sufficient extent as to bring the seal ring 92 above the vent or equalizing port 93, a shear screw 105 is provided in the sleeve 31, projecting inwardly thereof toward the mandrel 10. The shoulder 106 provided by the upper end of the intermediate mandrel section 13 will engage the shear screw 105 before the seal ring 92 can move above the vent port 93, and will preclude further upward movement of the mandrel 10 relative to the inner sleeve 31, thereby preventing opening of the vent port and release of the well packer from the well casing.

Figure 4:
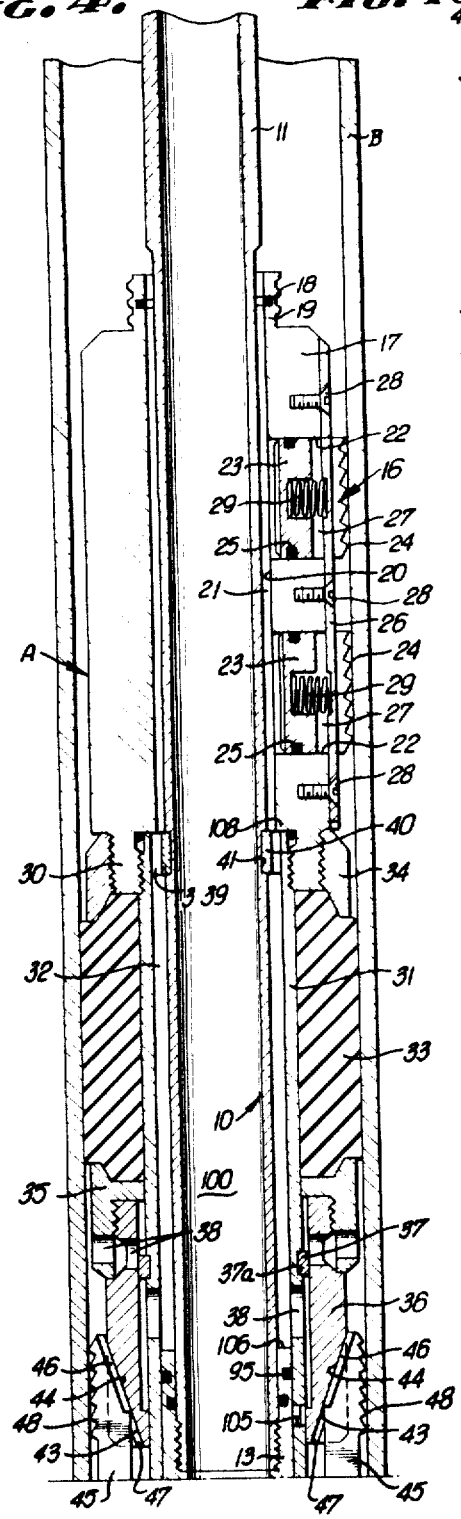
FIGS. 4 and 4a are longitudinal sections through the well tool disposed in a well casing, and corresponding to FIGS. 1 and 1a, illustrating the tool in condition for release from the well casing and removal therefrom, FIG. 4a constituting a lower continuation of FIG. 4.
Figure 4A:
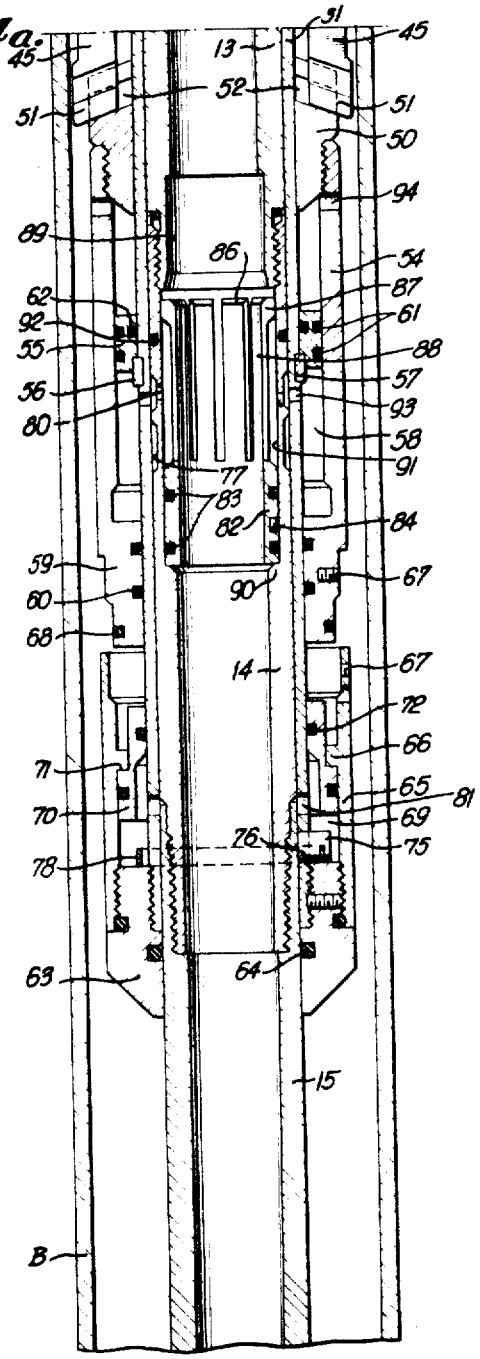
Figure 5:
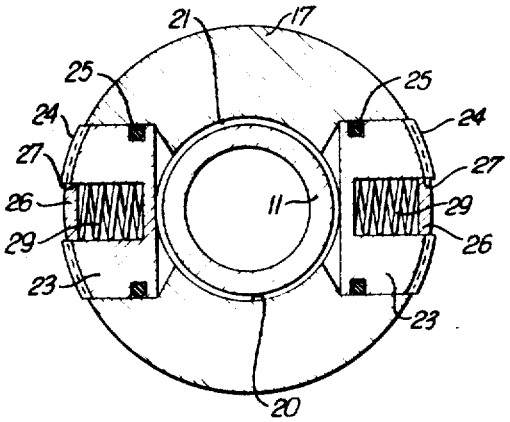
FIG. 5 is an enlarged cross-section taken along the line 5—5 on FIG. 1.
Figure 6:
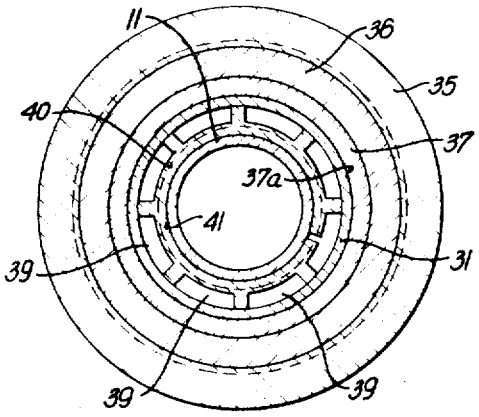
FIG. 6 is an enlarged cross-section taken along the line 6—6 on FIG. 1.
Figure 7:
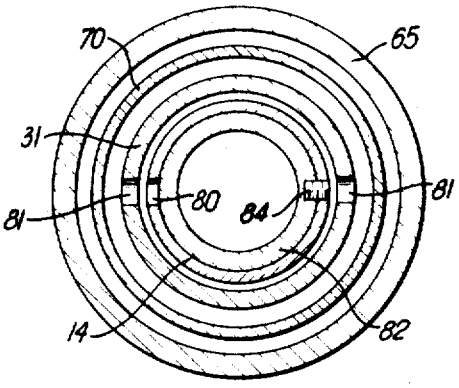
Figure 8:
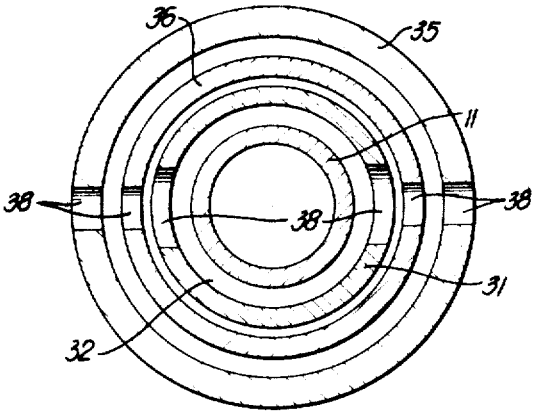
FIG. 8 is an enlarged cross-section taken along the line 8—8 on FIG. 2.

However, when the well packer A is to be released from the well casing, the tubing string C is moved upwardly, carrying the mandrel or body 10 upwardly with it, until the shoulder 106 engages the shear screw 105; whereupon a sufficient upward pull is taken on the tubular string and mandrel to shear the screw 105 and allow the mandrel to move upwardly to a position in which the stop ring 40 engages the downwardly facing shoulder 108 on the anchor body 17. At this time, the upper seal ring 92 is disposed above the vent port 93 allowing the hydrostatic head of fluid to pass into the previously sealed atmospheric chamber 58 (FIGS. 4, 4a). The hydrostatic head of fluid then also acts in an upward direction on the upper piston 55 and a downward direction on the lower piston 59, equalizing or offsetting the hydrostatic head of fluid acting on these parts in the opposite direction. With the pressure in the tubular string C and externally thereof equalized, the springs 29 shift the upper gripping members 23 inwardly and retract them from the well casing B. An upward pull can then be taken on the tubular string C, which will be transmitted through the mandrel 10 to the anchor body 17, shifting the latter upwardly and carrying the upper abutment 30, 34 upwardly away from the lower abutment 35, allowing the packing structure 33 to retract inherently from the well casing to its initial position. Continued upward movement carries the upper sleeve 31 upwardly, until the stop ring 37 engages the lower abutment 35, which will then shift the expander 36 upwardly relative to the slips 45, the inclined tongue and groove connections 46, 47 between the slips and the expander shifting the slips to retracted position. Upon upward movement of the inner setting sleeve 31 to a sufficient extent, its piston 55 will engage the slip ring 50 and move the outer sleeve 54 upwardly with it. The lower sleeve 65, release piston 70, lock pin 75, and other structure within the apparatus moves upwardly with the inner sleeve 31 and the mandrel 10, so that the entire tool A can be elevated in the well casing B and removed entirely therefrom at the top of the well bore.

Figure 10:
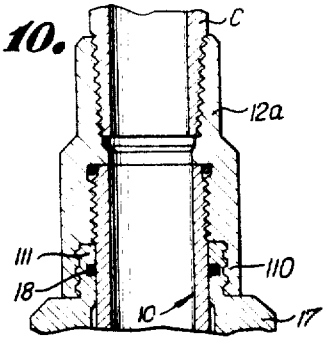
FIG. 10 is a longitudinal section through a modified upper portion of the well tool illustrated in FIGS. 1 to 9; inclusive.

With the form of invention illustrated in FIGS. 1 to 9, inclusive, the mandrel 10 is permitted to move longitudinally within the inner sleeve 31 and the anchor body 17. However, the mandrel can be secured to the anchor body and the sleeve, in which event the lock pin 75 and spring 78 are unnecessary, which is also true of the shear screw 105. As illustrated in FIG. 10, the upper coupling 12a has been modified so that it is not only threadedly attached to the upper end of the mandrel 10, but has another left-hand thread 110 for threadedly securing it to the upper threaded pin end 111 of the anchor body 17. Thus, the mandrel 10, anchor body 17 and inner sleeve 31 are attached together during running of the tool in the well casing and during setting of the well tool, and its remaining in set condition, within the well casing. The apparatus is operated in the same manner as heretofore described to effect its setting in the well casing. Since the mandrel 10 cannot move upwardly relative to the setting sleeve 31, the shear screw 105 is unnecessary to prevent inadvertent upward movement of the mandrel 10 to an extent opening the vent or equalizing port 93. When the packer is to be released, then the tubing string C is rotated to the right, which will cause unscrewing of the coupling 12a from the anchor body 17, which will then release the mandrel 10 from the anchor body, permitting its upward movement until the stop ring 40 engages the lower shoulder 108 on the body 17, at which time the seal ring 92 is disposed above the vent port 93, opening the latter to the hydrostatic head of fluid in the well bore. The pressure in and around the apparatus is then equalized, if equalization has not previously occurred, and the tubing string C and mandrel 10 moved upwardly, all of the parts returning to their initial retracted positions, so that the well tool can be elevated in the well casing and removed entirely therefrom.

The inventor claims:

1. In apparatus adapted to be set in a well bore: a body; normally retracted means disposed about said body and adapted to be expanded outwardly into engagement with the wall of the well bore: upper actuating means engaging an upper portion of said normally retracted means and comprising an upper setting sleeve surrounding said body; lower actuating means engaging a lower portion of said normally retracted means and comprising a lower setting sleeve; hydraulically operable means on said sleeves *movable toward each other* for shifting said upper and lower actuating means relative to each other to expand said normally retracted means, said hydraulically operable means on each sleeve being slidable along the other sleeve; and means for enabling fluid pressure to act on said hydraulically operable means.

2. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve surrounding said body; lower actuating means engaging a lower portion of said normally retracted means and comprising a lower setting sleeve; hydraulically operable means on said sleeves *movable toward each other* for shifting said upper and lower actuating means relative to each other to expand said normally retracted means, said hydraulically operable means on each sleeve being slidable along the other sleeve; means for enabling fluid pressure to act on said hydraulically operable means; and means for equalizing the pressure acting on said hydraulically operable means to enable said normally retracted means to be retracted.

3. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve surrounding said body; lower actuating means engaging a lower portion of said normally retracted means and comprising a lower setting sleeve; hydraulically operable means on said sleeves for shifting said upper and lower actuating means relative to each other to expand said normally retracted means, said hydraulically operable means on each sleeve being slidable along the other sleeve; means for enabling fluid pressure to act on said hydraulically operable means; means operable by said body for equalizing the pressure acting on said hydraulically operable means to enable said normally retracted means to be retracted; and releasable means securing said body to one of said sleeves to prevent operation of said equalizing means.

4. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve surrounding said body; lower actuating means engaging a lower portion of said normally retracted means and comprising a lower setting sleeve; hydraulically operable means responsive to the hydrostatic head of fluid in the well bore for shifting said upper and lower sleeves and said upper and lower actuating means relative to each other to expand said normally retracted means, said hydraulically operable means on each sleeve being slidable along the other sleeve; and means for enabling the hydrostatic head of fluid to act on said hydraulically operable means.

5. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve surrounding said body; lower actuating means engaging a lower portion of said normally retracted means and comprising a lower setting sleeve; hydraulically operable means responsive to the hydrostatic head of fluid in the well bore for shifting said upper and lower sleeves and said upper and lower actuating means relative to each other to expand said normally retracted means, said hydraulically operable means on each sleeve bring slidable along the other sleeve; means for enabling the hydrostatic head of fluid to act on said hydraulically operable means; and means operable by said body for equalizing the hydrostatic head of fluid acting on said hydraulically operable means to enable said normally retracted means to be retracted from its outwardly expanded position.

6. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve surrounding said body; lower actuating means engaging a lower portion of said normally retracted means and comprising a lower setting sleeve; hydraulically operable means responsive to the hydrostatic head of fluid in the well bore for shifting said upper and lower sleeves and said upper and lower actuating means relative to each other to expand said normally retracted means, said hydraulically operable means on each sleeve being slidable along the other sleeve; means for enabling the hydrostatic head of fluid to act on said hydraulically operable means; means operable by said body for equalizing the hydrostatic head of fluid acting on said hydraulically operable means to enable said normally retracted means to be retracted from its outwardly expanded position; and releasable means securing said body to one of said sleeves to prevent operation of said equalizing means.

7. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve; lower actuating means engaging a lower portion of said normally retracted means and comprising a lower setting sleeve; opposed pistons on said sleeves, said piston on each sleeve sealingly engaging the other sleeve to provide an atmospheric chamber into which well bore fluid cannot enter initially, said pistons being responsive to the hydrostatic head of fluid in the well bore for relatively shifting said sleeves and upper and lower actuating means to expand said normally retracted means; means for preventing the hydrostatic head of fluid from shifting said pistons; and means for releasing said preventing means to permit the hydrostatic head of fluid to shift said pistons and effect expansion of said normally retracted means.

8. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve; lower actuating means engaging a lower portion of said normally retracted means and comprising a lower setting sleeve; opposed pistons on said sleeves, said piston on each sleeve sealingly engaging the other sleeve to provide an atmospheric chamber into which well bore fluid cannot enter initially, said pistons being responsive to the hydrostatic head of fluid in the well bore for relatively shifting said sleeves and upper and lower actuating means to expand said normally retracted means; means for preventing the hydrostatic head of fluid from shifting said pistons; means for releasing said preventing means to permit the hydrostatic head of fluid to shift said pistons and effect expansion of said normally retracted means; and means for exposing said atmospheric chamber to the hydrostatic head of fluid in the well bore to enable said normally retracted means to retract from expanded position.

9. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve; lower actuating means engaging a lower portion of said normally retracted means and comprising a lower setting sleeve; opposed pistons on said sleeves, said piston on each sleeve sealingly engaging the other sleeve to provide an atmospheric chamber into which well bore fluid cannot enter initially, said pistons being responsive to the hydrostatic head of fluid in the well bore for relatively shifting said sleeves and upper and lower actuating means to expand said normally retracted means; means for preventing the hydrostatic head of fluid from shifting said pistons; means for releasing said preventing means to permit the hydrostatic head of fluid to shift said pistons and effect expansion of said normally retracted means; and means operable by said body for exposing said atmospheric chamber to the hydrostatic head of fluid in the well bore to enable said normally retracted means to retract from expanded position.

10. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve; lower actuating means engaging a lower portion of said normally retracted means and comprising a lower setting sleeve; opposed pistons on said sleeves, said piston on each sleeve sealingly engaging the other sleeve to provide an atmospheric chamber into which well bore fluid cannot enter initially, said pistons being responsive to the hydrostatic head of fluid in the well bore for relatively shifting said sleeves and upper and lower actuating means to expand said normally retracted means; means for preventing the hydrostatic head of fluid from shifting said pistons; means for releasing said preventing means to permit the hydrostatic head of fluid to shift said pistons and effect expansion of said normally retracted means; means operable by said body for exposing said atmospheric chamber to the hydrostatic head of fluid in the well bore to enable said normally retracted means to retract from expanded position; and releasable means securing said body to one of said sleeves to prevent operation of said exposing means.

11. In apparatus adapted to be set in a well bore: a body: normally retracted means disposed about said body and adapted to be expanded outwardly into engagement with the wall of the well bore; upper actuating means engaging an upper portion of said normally retracted means and comprising an upper setting sleeve; lower actuating means engaging a lower portion of said normally retracted means and comprising a lower setting sleeve; opposed pistons on said sleeves, said piston on each sleeve sealingly engaging the other sleeve to provide an atmospheric chamber into which well bore fluid cannot enter initially, said pistons being responsive to the hydrostatic head of fluid in the well bore for relatively shifting said sleeves and upper and lower actuating means to expand said normally retracted means; means releasably interconnecting said sleeves to prevent the hydrostatic head of fluid from shifting said pistons and sleeves; and hydraulically operable means for releasing said interconnecting means to permit the hydrostatic head of fluid to shift said pistons and sleeves.

12. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve; lower actuating means engaging a lower portion of said normally retracted means and comprising a lower setting sleeve; opposed pistons on said sleeves, said piston on each sleeve sealingly engaging the other sleeve to provide an atmospheric chamber into which well bore fluid cannot enter initially, said pistons being responsive to the hydrostatic head of fluid in the well bore for relatively shifting said sleeves and upper and lower actuating means to expand said normally retracted means; means releasably interconnecting said sleeves to prevent the hydrostatic head of fluid from shifting said pistons and sleeves; releasable means securing said body to one of said sleeves; hydraulically operable means initially preventing release of said releasable means and for releasing said interconnecting means; means for initially preventing fluid pressure from acting on said hydraulically operable means; and means for shifting said initially preventing means to a position permitting fluid pressure to act on said hydraulically operable means to shift said hydraulically operable means and release said releasable means and interconnecting means.

13. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve; lower actuating means engaging a lower portion of said normally retracted means and comprising a lower setting sleeve; opposed pistons on said sleeves, said piston on each sleeve sealingly engaging the other sleeve to provide an atmospheric chamber into which well bore fluid cannot enter initially, said pistons being responsive to the hydrostatic head of fluid in the well bore for relatively shifting said sleeves and upper and lower actuating means to expand said normally retracted means; means releasably interconnecting said sleeves to prevent the hydrostatic head of fluid from shifting said pistons and sleeves; hydraulically operable means for releasing said interconnecting means to permit the hydrostatic head of fluid to shift said pistons and sleeves; and releasable means securing said body to one of said sleeves.

14. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve; lower actuating means engaging a lower portion of said normally retracted means and comprising a lower setting sleeve; opposed pistons on said sleeves, said piston on each sleeve sealingly engaging the other sleeve to provide an atmospheric chamber into which well bore fluid cannot enter initially, said pistons being responsive to the hydrostatic head of fluid in the well bore for relatively shifting said sleeves and upper and lower actuating means to expand said normally retracted means; means releasably interconnecting said sleeves to prevent the hydrostatic head of fluid from shifting said pistons and sleeves; hydraulically operable means for releasing said interconnecting means to permit the hydrostatic head of fluid to shift said pistons and sleeves; and means operable by said body for exposing said atmospheric chamber to the hydrostatic head of fluid in the well bore to enable said normally retracted means to retract from expanded position.

15. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve; lower actuating means engaging a lower portion of said normally retracted means and comprising a lower setting sleeve; opposed pistons on said sleeves, said piston on each sleeve sealingly engaging the other sleeve to provide an atmospheric chamber into which well bore fluid cannot enter initially, said pistons being responsive to the hydrostatic head of fluid in the well bore for relatively shifting said sleeves and upper and lower actuating means to expand said normally retracted means; means releasably interconnecting said sleeves to prevent the hydrostatic head of fluid from shifting said pistons and sleeves; releasable means securing said body to one of said sleeves; hydraulically operable means initially preventing release of said releasable means and for releasing said interconnecting means; means for initially preventing fluid pressure from acting on said hydraulically operable means; means for shifting said initially preventing means to a position permitting fluid pressure to act on said hydraulically operable means to shift said hydraulically operable means and release said releasable means and interconnecting means; and means operable by said body after its release from said one sleeve for exposing said atmospheric chamber to the hydrostatic head of fluid in the well bore to enable said normally retracted means to retract from expanded position.

16. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve; lower actuating means engaging a lower portion of said normally retracted means and comprising a lower setting sleeve; opposed pistons on said sleeves, said piston on each sleeve sealingly engaging the other sleeve to provide an atmospheric chamber into which well bore fluid cannot enter initially, said pistons being responsive to the hydrostatic head of fluid in the well bore for relatively shifting said sleeves and upper and lower actuating means to expand said normally retracted means; means releasably interconnecting said sleeves to prevent the hydrostatic head of fluid from shifting said pistons and sleeves; hydraulically operable means for releasing said interconnecting means to permit the hydrostatic head of fluid to shift said pistons and sleeves; releasble means securing said body to one of said sleeves; and means operable by said body after its release from said one sleeve for exposing said atmospheric chamber to the hydrostatic head of fluid in the well bore to enable said normally retracted means to retract from expanded position.

17. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve surrounding said body; lower actuating means engaging a lower portion of said normally retracted means and comprising a lower setting sleeve surrounding said upper sleeve and spaced laterally therefrom a piston connected to said upper sleeve and slidably and sealingly engaging said lower sleeve a piston connected to said lower sleeve and sealingly engaging said upper sleeve said pistons and sleeves providing an atmospheric chamber into which well bore fluid cannot enter initially; said pistons being responsive to the hydrostatic head of fluid in the well bore for relatively shifting said sleeves and upper and lower actuating means to expand said normally retracted means; means releasably interconnecting said sleeves to prevent the hydrostatic head of fluid from shifting said pistons and sleeves; hydraulically operable means for shifting said preventing means to a position permitting the hydrostatic head of fluid to act on said pistons and shift said pistons, sleeves and upper and lower actuating means to expand said normally retracted means; means operable by said body for exposing said atomspheric chamber to the hydrostatic head of fluid in the well bore to enable said normally retracted means to retract from its outwardly expanded position.

18. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve surrounding said body; lower actuating means engaging a lower portion of said normally retracted means and comprising a lower setting sleeve surrounding said upper sleeve and spaced laterally therefrom; a piston connected to said upper sleeve and slidably and sealingly engaging said lower sleeve; a piston connected to said lower sleeve and sealingly engaging said upper sleeve; said pistons and sleeves providing an atmospheric chamber into which well bore fluid cannot enter initially; said pistons being responsive to the hydrostatic head of fluid in the well bore for relatively shifting said sleeves and upper and lower actuating means to expand said normally retracted means; means releasably interconnecting said sleeves to prevent the hydrostatic head of fluid from shifting said pistons and sleeves; hydraulically operable means for shifting said preventing means to a position permitting the hydrostatic head of fluid to act on said pistons and shift said pistons, sleeves and upper and lower actuating means to expand said normally retracted means; means operable by said body for exposing said atmospheric chamber to the hydrostatic head of fluid in the well bore to enable said normally retracted means to retract from its outwardly expanded position; and lock means engaged by said hydraulically operable means for releasably connecting said body to said upper sleeve, said lock means being released upon actuation of said hydraulically operable means to shift said preventing means to allow said body to move said exposing means to open said atmospheric chamber to the hydrostatic head of fluid in the well bore.

19. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve surrounding said body; lower actuating means engaging a lower portion of said normally retracted means and comprising a lower setting sleeve surrounding said upper sleeve and spaced laterally therefrom; a piston connected to said upper sleeve and slidably and sealingly engaging said lower sleeve; a piston connected to said lower sleeve and sealingly engaging said upper sleeve; said pistons and sleeves providing an atmospheric chamber into which well bore fluid cannot enter initially; said pistons being responsive to the hydrostatic head of fluid in the well bore for relatively shifting said sleeves and upper and lower actuating means to expand said normally retracted means; means releasably interconnecting said sleeves to prevent the hydrostatic head of fluid from shifting said pistons and sleeves; hydraulically operable means for shifting said preventing means to a position permitting the hydrostatic head of fluid to act on said pistons and shift said pistons, sleeves and upper and lower actuating means to expand said normally retracted means; means operable by said body for exposing said atmospheric chamber to the hydrostatic head of fluid in the well bore to enable said normally retracted means to retract from its outwardly expanded position; and means releasably connecting said body to said upper sleeve, release of said means enabling said body to be moved relative to said upper sleeve to operate said atmospheric chamber exposing means.

*20. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve and an upper piston on said upper setting sleeve; lower actuating means engaging a lower portion of said normally retracted means and comprising a lower setting sleeve and a lower piston on said lower sleeve; said piston on each sleeve sealingly and slidably engaging the other sleeve; said pistons being movable relatively toward each other for shifting said sleeves relative to said body and said upper and lower actuating means relatively toward each other to expand said normally retracted means; and means for enabling hydraulic pressure to act on said pistons.*

*21. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve and an upper piston on said upper setting sleeve; lower actuating*

*means engaging a lower portion of said normally retracted means and comprising a lower setting sleeve and a lower piston below said upper piston; said piston on each sleeve sealingly and slidably engaging the other sleeve; said upper and lower pistons being movable relatively toward each other for shifting said upper and lower actuating means relatively toward each other to expand said normally retracted means; and means for enabling hydraulic pressure to act upwardly on said lower piston and downwardly on said upper piston.*

*22. In apparatus adapted to be set in a well bore: a body; normally retracted means disposed about said body and adapted to be expanded outwardly into engagement with the wall of the well bore; upper actuating means engaging an upper portion of said normally retracted means and comprising an upper setting sleeve and an upper piston on said upper setting sleeve; lower actuating means comprising a transverse member engaging a lower portion of said normally retracted means, a lower setting sleeve secured to and depending from said transverse member and a lower piston on said lower sleeve slidably and sealingly engaging said upper sleeve; said upper piston being disposed between said transverse member and lower*

*piston and sealingly engaging said lower sleeve; and means for enabling hydraulic pressure to act on said upper and lower actuating means to relatively shift said upper and lower actuating means toward each other and to also shift said pistons toward each other.*

References Cited by the Examiner

The following references, cited by the Examiner, are of record in the patented file of this patent or the original patent.

UNITED STATES PATENTS

| | | | |
|---|---|---|---|
| 2,507,270 | 4/1950 | Ragan | 166—120 X |
| 2,695,064 | 11/1954 | Ragan et al. | 166—120 |
| 2,735,497 | 2/1956 | Brumlen | 166—212 |
| 2,739,651 | 3/1956 | Brown | 166—119 |
| 2,765,853 | 10/1956 | Brown | 166—134 |
| 2,795,281 | 6/1957 | Christian | 166—120 |
| 3,008,523 | 11/1961 | Clark et al. | 166—129 |
| 3,122,205 | 2/1964 | Broun et al. | 166—120 |

CHARLES E. O'CONNELL, *Primary Examiner.*

J. A. LEPPINK, *Assistant Examiner.*